US006989972B1

(12) United States Patent
Stoev et al.

(10) Patent No.: US 6,989,972 B1
(45) **Date of Patent: *Jan. 24, 2006**

(54) MAGNETORESISTIVE SENSOR WITH OVERLAPPING LEADS HAVING DISTRIBUTED CURRENT

(75) Inventors: Kroum Stoev, Fremont, CA (US); Mathew Gibbons, Livermore, CA (US); Francis Liu, Fremont, CA (US); Bogdan M. Simion, Pleasanton, CA (US); Aparna C. Vadde, Fremont, CA (US); Jing Zhang, San Jose, CA (US); Yiming Huai, Pleasanton, CA (US); Marcos M. Lederman, San Francisco, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/261,119

(22) Filed: Sep. 30, 2002

(51) Int. Cl.
*G11B 5/39* (2006.01)

(52) U.S. Cl. ........................................................ 360/322

(58) Field of Classification Search ................. 360/322
See application file for complete search history.

(56) References Cited

U.S. PATENT DOCUMENTS

| | | | | |
|---|---|---|---|---|
| 5,268,806 | A | 12/1993 | Goubau et al. | 360/113 |
| 5,876,843 | A * | 3/1999 | Ishiwata | 360/322 |
| 6,163,426 | A | 12/2000 | Nepela et al. | 360/66 |
| 6,219,207 | B1 * | 4/2001 | Pinarbasi | 360/322 |
| 6,344,953 | B1 | 2/2002 | Kautzky et al. | 360/322 |
| 6,359,760 | B2 | 3/2002 | Kanno | 360/322 |
| 6,385,016 | B1 | 5/2002 | van Ek et al. | 360/322 |
| 6,525,912 | B2 * | 2/2003 | Sato | 360/322 |
| 6,587,315 | B1 * | 7/2003 | Aoki et al. | 360/322 |
| 2002/0093773 | A1 * | 7/2002 | Pinarbasi | 360/322 |
| 2002/0191353 | A1 * | 12/2002 | Sato | 360/322 |
| 2003/0007295 | A1 * | 1/2003 | Kamijima et al. | 360/322 |

* cited by examiner

*Primary Examiner*—Craig A. Renner
(74) *Attorney, Agent, or Firm*—Sawyer Law Group LLP; Joshua C. Harrison, Esq.

(57) ABSTRACT

Magnetoresistive (MR) sensors have leads that overlap a MR structure and distribute current to the MR structure so that the current is not concentrated in small portions of the leads. An electrically resistive capping layer can be formed between the leads and the MR structure to distribute the current. The leads can include resistive layers and conductive layers, the resistive layers having a thickness-to-resistivity ratio that is greater than that of each of the conductive layers. The resistive layers may protect the conductive layers during MR structure etching, so that the leads have broad layers of electrically conductive material for connection to MR structures. The broad leads conduct heat better than the read gap material that they replace, further reducing the temperature at the connection between the leads and the MR structure.

15 Claims, 3 Drawing Sheets

MAGNETORESISTIVE SENSOR WITH OVERLAPPING LEADS HAVING DISTRIBUTED CURRENT

BACKGROUND

The present invention relates to magnetoresistive (MR) sensing mechanisms, which may for example be employed in information storage systems or measurement and testing systems.

FIG. 1 shows a media-facing view of a prior art magnetoresistive (MR) sensor 20 that may for example be used in a head of a disk drive. A MR structure 22 is formed including one or more ferromagnetic layers so that the structure 22 has a resistance that varies in response to an applied magnetic field. Lead layers 25 have been formed that carry current through the MR structure 22 to gauge the change in resistance and thereby sense the magnetic field. Bias layers 27 abut the structure to stabilize magnetic domains at the edges of the MR structure 22 and reduce noise in the sensor 100. A pair of magnetically soft shield layers 30 and 33 block stray magnetic fields from the MR structure 22, although fields that originate from the media opposite the MR structure 22 are not blocked by the shields. The shields 30 and 33 are isolated from the MR structure 22, leads 25 and bias layers 27 by first and second dielectric read layers 35 and 38.

The lead layers 25 may be made of gold that has been formed atop a tantalum seed layer and capped with another thin tantalum layer. The lead layers 25 overlap the MR structure 22 to contact the MR structure 22 at sharp points 40 and 42. Because the lead layers 25 overlap the MR structure 22, the effective sensing width of the sensor 20 is less than the width of the MR structure 22. The distance between the lead layers is sometimes called the track-width of the sensor 20. The electric current that flows through the MR structure 22 primarily flows through points 40 and 42, which can cause excessive heating at those points, reducing the sensitivity of the sensor and leading to other problems such as electromigration and damage to the sensor.

SUMMARY

Magnetoresistive (MR) sensors are disclosed that have leads that overlap a MR structure and distribute current to and from the MR structure so that the current is not concentrated in small portions of the leads, alleviating the problems mentioned above. For example, an electrically resistive capping layer of tantalum or other materials can be formed to sufficient thickness on a MR structure prior to etching the structure and forming the bias and lead layers. The capping layer can have a greater thickness in portions adjoining the leads than in a central region not covered by the leads. Alternatively or in combination, the leads can be formed of a resistive material, or may have interspersed layers of resistive and conductive materials with gold or other highly conductive materials. For the situation in which a resistive lead layer also has a significantly lower milling rate, the leads can have broad layers of material for connection to MR structure, which may have a higher resistivity but lower overall resistance. The broad leads also conduct heat better than the read gap material that they replace, further reducing the temperature at the connection between the leads and the MR structure.

DETAILED DESCRIPTION OF THE PREFERRED EMBODIMENTS

Figure 2:
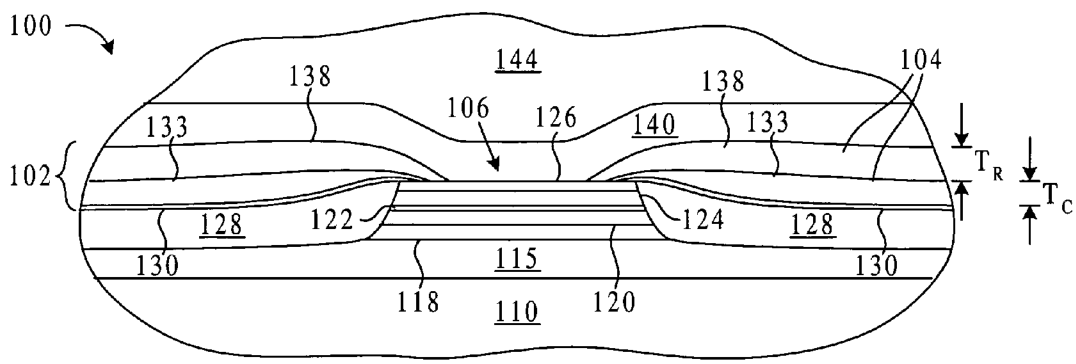
FIG. 2 is a cut-away view of a media-facing surface of a MR sensor in accordance with the present invention.

FIG. 2 shows a view of a media-facing surface of a MR sensor 100 that has leads 102 and 104 that overlap an MR structure 106 and distribute current to the MR structure 106. The media-facing surface may be coated with a thin layer of hard dielectric material such as diamond-like carbon (DLC) that is transparent and so not shown in FIG. 2, the media-facing surface labeled 150 in FIG. 3. The MR sensor 100 has been formed on a wafer substrate along with thousands of similar sensors and optional inductive recording transducers, not shown, before the wafer was diced into individual units, polished and coated to form the media-facing surface shown. Atop the substrate a first magnetically soft shield layer 110 has been formed, after which a first dielectric read gap layer 115 was deposited and polished. The MR structure 106 was then deposited in a series of layers atop the first read gap layer 115, beginning with a pinning layer 118 or layers including antiferromagnetic (AF) material for pinning a magnetic moment of a first ferromagnetic layer 120, also known as a pinned layer 120. A nonferromagnetic spacer layer 122 was then formed, for example of copper or gold, followed by a second ferromagnetic layer 124, also known as a free layer 124. A capping layer 126 was then formed, for example of tantalum, after which the sensor layers were masked and etched to define MR structure 106.

Bias layers 128 were then formed for example of AF or high coercivity ferromagnetic material, and the mask covering structure 106 removed, lifting off bias material that had been deposited atop the mask. Another mask was then formed that partly covered the MR structure 106, so that leads 102 and 104 could be formed on opposite sides of the mask. An adhesion layer 130 of tantalum or chromium was formed to a thickness of between about 10 Å and 200 Å, followed by a conductive layer 133 made of materials having a resistivity ($r_C$) of less than $6\times10^{-8}$ Ωm at 25° C., such as gold, silver, copper, aluminum, beryllium, rhodium or tungsten. The adhesion layer can also be made of a layer of chromium followed by a layer of tantalum, so that the tantalum has an alpha tantalum phase, as described below. The conductive layer 133 has a thickness in a range between about 50 Å and 500 Å in this example.

A resistive layer 138 was then formed on the conductive layer 133, the resistive layer also having a slow ion-milling rate. The resistive layer 138 may for example include chromium, palladium, platinum or beta tantalum (β-Ta), and typically has a resistivity ($r_R$) that is greater than $10^{-7}$ Ωm at 25° C. In order to encourage conduction in the resistive layer 138 as well as the conductive layer 133, a thickness ($T_R$) of the resistive layer is substantially greater than a thickness ($T_C$) of the conductive layer. In general, a ratio of the thickness $T_R$ of the resistive layer 138 compared to the thickness $T_C$ of the conductive layer 133 should be greater than or about equal to a ratio of the resistivity ($r_R$) of the resistive layer 138 compared to the resistivity ($r_C$) of the conductive layer 133. The thickness of the layers is easy to measure in an area distal to the MR structure 106 but closest to the media-facing surface 150. Stated differently, $T_R/T_C > r_R/r_C$ or $T_R/T_C \approx r_R/r_C$. Alternatively, $T_R/r_R > T_C/r_C$ or $T_R/r_R \approx T_C/r_C$. The current in leads 102 and 104 is thus spread between the conductive layer 133 and the resistive layer 138, avoiding current crowding.

Moreover, the resistive layer 138 (e.g., tantalum) can be much harder than the conductive layer 133 (e.g., gold) so that less of leads 102 and 104 may be removed during a subsequent etching step that determines the height of the MR structure 106 from the media-facing surface, as explained below, further reducing current crowding and lowering lead resistance. After the MR structure 106 height was defined, a second dielectric read gap layer 140 was deposited, on top of which a second magnetically soft shield layer 144 was formed. Although not shown in this figure, an inductive transducer may be formed prior to or subsequent to the MR sensor 100, for example to create a head that writes and reads information on a storage medium.

Figure 3:
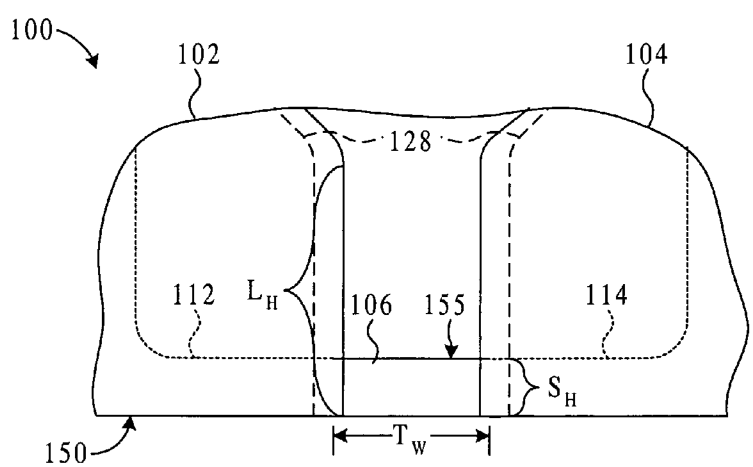
FIG. 3 is a cut-away opened up view of the sensor of FIG. 2.

FIG. 3 is an opened up view of the sensor 100 of FIG. 2, which illustrates an advantage mentioned above. The media-facing surface 150 is evident in this view, as are MR structure 106 and leads 102 and 104. Bias layers 128 are covered by the leads 102 and 104, which partially overlap MR structure 106. MR structure 106 has been masked and etched, for example by ion beam etching (IBE), to create a back edge 155 that defines a height $S_H$ of the structure 106 from the media-facing surface 150. The leads 102 and 104 have been partially etched during the creation of edge 155, as shown by dotted lines 112 and 114, respectively. The hard alpha tantalum layers 138 protect the gold layers 133 during etching so that part of the alpha tantalum layers 138 and all of the gold layers 133 remain intact.

Figure 1:
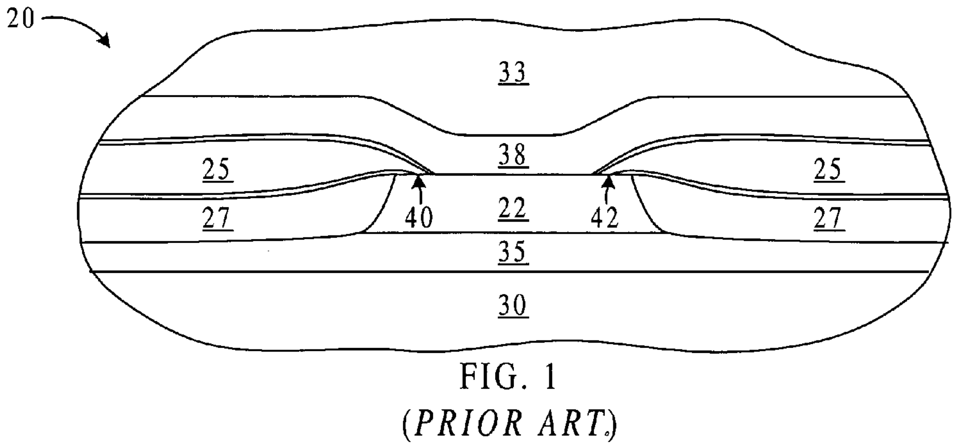
FIG. 1 is a cut-away view of a media-facing surface of a prior art MR sensor.

In contrast, during the creation of a back edge for the prior art MR structure 22 shown in FIG. 1, the soft gold leads 25 would have been fully removed at areas such as those bounded by dotted lines 112 and 114, exposing bias layers 27 and leaving only thin leads connected to the MR structure 22. The thicker alpha tantalum layers 138 shown in FIG. 3 have not been completely removed above lines 112 and 114, so that the lead height $L_H$ for this embodiment is substantially greater than the MR structure height $S_H$. The gold lead layer covered by the alpha tantalum layers 138 also remains intact in this case. This greater lead height $L_H$ decreases the electrical resistance of the leads 102 and 104 and increases the thermal conductivity of the material directly adjoining the contact between the leads 102 and 104 and the MR structure 106. A track width $T_W$ of the sensor 100 is slightly less than the spacing between leads 102 and 104, due to the broadened contacts of those leads with the MR structure 106.

Figure 4:
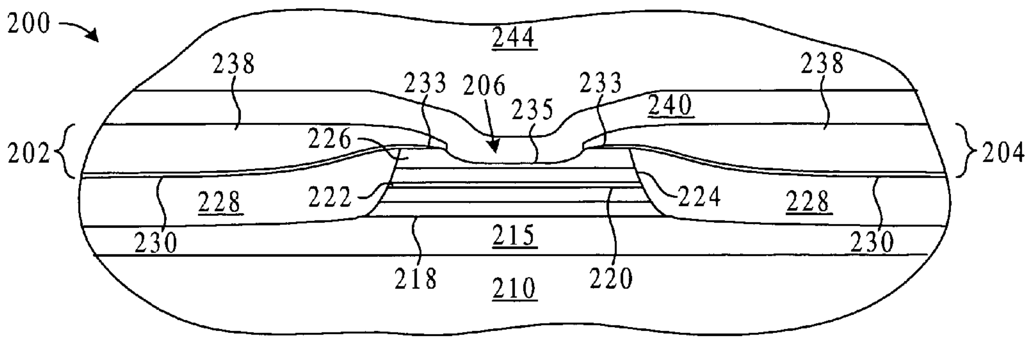
FIG. 4 is a cut-away view of a media-facing surface of another embodiment of a MR sensor that has leads that overlap an MR structure and distribute current to and from the MR structure.

FIG. 4 shows another embodiment of a MR sensor 200 that has leads 202 and 204 that overlap an MR structure 106 and distribute current to an MR structure 206. In this embodiment, leads 202 and 204 are formed of a layer 238 of alpha tantalum formed on a bcc seed layer 230 such as Cr, W, TaW or TiW that promotes the formation of alpha tantalum, although leads 202 and 204 could instead be formed of a multilayer structure described above or below. Similar to the embodiment described above, MR sensor 200 has first and second magnetically soft shield layers 210 and 244, first and second dielectric read gap layers 215 and 240, a pinning layer 218 or layers, a pinned ferromagnetic layer 220, a nonferromagnetic spacer layer 222, a free ferromagnetic layer 224 and bias layers 228. Note that in this embodiment or the previous embodiment the ordering of pinning, pinned and free layers may be reversed.

A capping layer 226 of MR structure 206, however, has thicker portions 233 disposed beneath leads 202 and 204, and a thinner portion 235 disposed between the thicker portions. Although for some embodiments capping layer 226 may have a greater conductivity, the capping layer 226 in this embodiment has a resistivity greater than $10^{-7}$ Ωm at 25° C. The thicker portions of resistive capping layer 226, which may for example be made of beta tantalum, distribute the current to MR structure 206, providing a lead overlay sensor that avoids current crowding. The thinner portion 235 restricts current flow through capping layer 226 so that layer 226 does not shunt current flow from the MR structure. The thicker portions 235 may have a thickness in a range between about 20 Å and 500 Å, with the thinner regions having a thickness less than about half that of the thicker regions. Alternatively or in addition, the thinner region may be oxidized throughout most if not all of its thickness. It is also possible to form capping layer 226 as a pair of isolated islands at thicker regions 233, with thinner region 235 removed. An advantage of these embodiments is that they provide closer shield-to-shield spacing and/or thicker leads without shield-to-sensor shorting. Closer shield-to-shield spacing improves the focus of the sensor 200, and thicker leads lower the lead resistance and therefore improve the signal-to-noise ratio, both of which improve sensor resolution.

Figure 5:
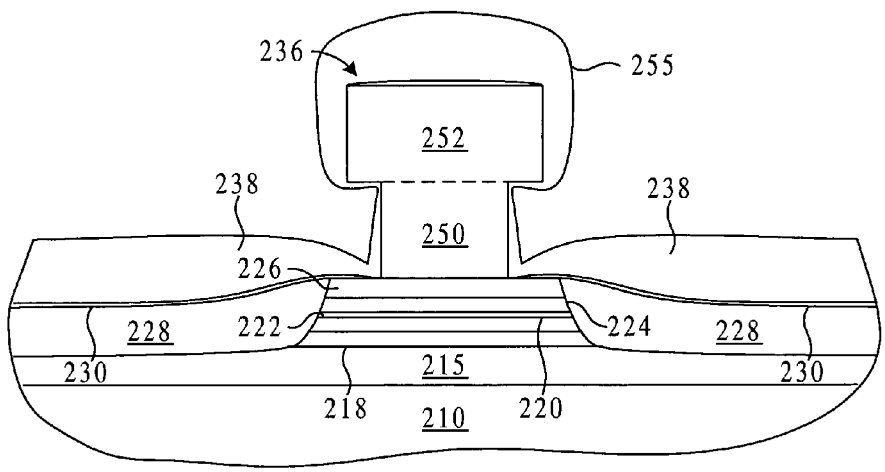
FIG. 5 is a cut-away cross-sectional view of a step in the formation of the MR sensor of FIG. 4.

FIG. 5 is a cross-sectional view of a step in the formation of the transducer 200 of FIG. 4. In FIG. 5, a bi-layer mask 236 has been formed of PMGI 250 and photoresist 252, the mask partly covering beta tantalum capping layer 226. Bcc seed layers 230 and alpha tantalum lead layers 238 have been sputter-deposited on bias layers 228 and also on and around the mask 236. The overhanging photoresist 252 allows undercut PMGI layer 250 to remain exposed, provided that the lead layers 238 are not deposited too thickly, allowing the mask to be chemically dissolved and the metal atop the mask to be lifted off. For the situation depicted in FIG. 5, however, metal leads 238 and seed layer 230 have completely enveloped mask 236. In this case a metal cap 255 covering mask 236 can be removed by breaking the cap off during washing with the resist solvent, for example by agitating the solvent and/or the wafer.

Figure 6:
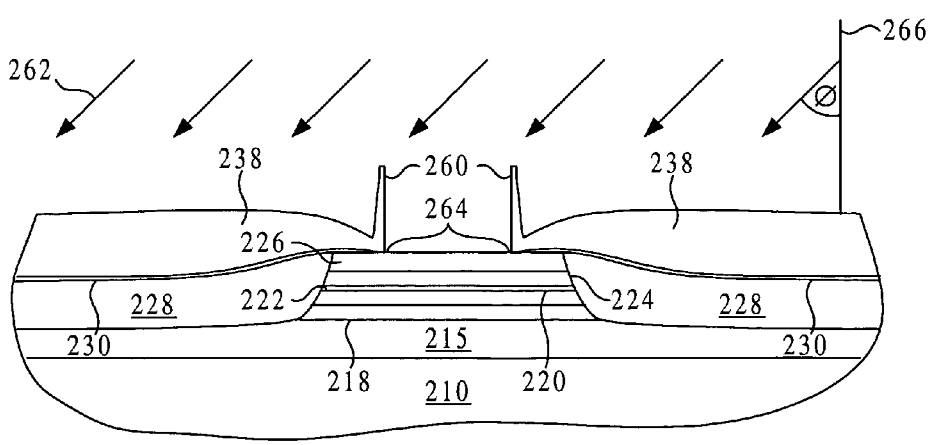
FIG. 6 is a cut-away cross-sectional view of a step in the formation of the MR sensor subsequent to the step shown in FIG. 5.

As shown in FIG. 6, metal projections 260 may remain after washing with the solvent has lifted off the cap. These projections 260, which may look like fences at the end of each lead, can create unwanted electrical connections between the leads and the second shield layer. An isotropic or anisotropic etching procedure such as ion beam etching (IBE) or reactive ion etching (RIE) can remove projections 260 while thinning the capping layer 226 in a region 264 that is uncovered by leads 238. For example, an IBE 262 may be directed at a rotating or sweeping angle Ø to perpendicular 266 to the wafer surface. An isotropic etching process, especially an etching process that selectively removes the capping layer and projections at a higher rate than the free layer, may also be effective.

Figure 7:
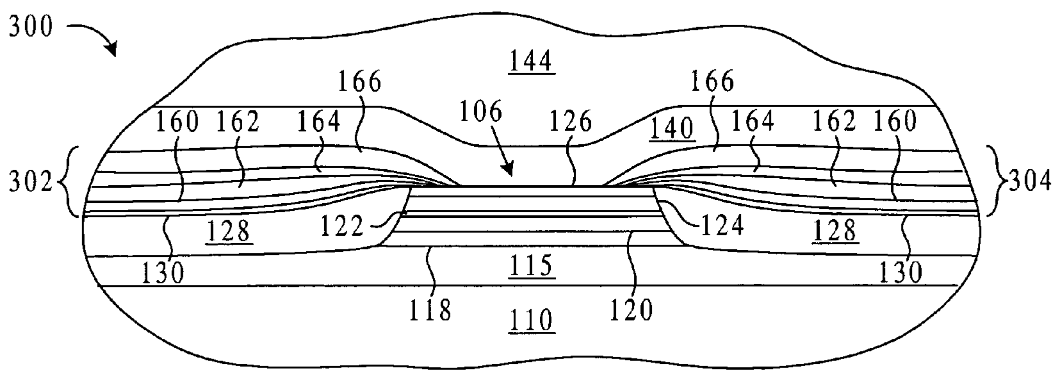
FIG. 7 is a cut-away view of a media-facing surface of another embodiment of a MR sensor that has leads that overlap an MR structure and distribute current to and from the MR structure.

FIG. 7 shows a view of a media-facing surface of a MR sensor 300 that is similar to that shown in FIG. 2, for which a number of the elements can be substantially identical and so are not described here. Leads 302 and 304 overlap MR structure 106 and distribute current to the MR structure 106, the leads including plural layers of conductive material and plural layers of resistive material. In this example, conductive layers 160 and 164 have a resistivity less than $6\times10^{-8}$ Ωm at 25° C., whereas resistive layers 162 and 166 have a resistivity greater than $10^{-7}$ Ωm at 25° C. The overall thickness of the resistive layers 162 and 166 (i.e., the sum of the thickness of each layer 162 and 166) is substantially greater than a overall thickness ($T_C$) of the conductive layers 160 and 164. In general, a ratio of the overall thickness $T_R$ of the resistive layers 162 and 166 compared to the overall thickness $T_C$ of the conductive layers 160 and 164 should be greater than or about equal to a ratio of the average resistivity ($r_R$) of the resistive layers 130, 162 and 166 compared to the resistivity ($r_C$) of the conductive layers 160 and 164. Stated differently, $T_R/T_C>r_R/r_C$ or $T_R/T_C\approx r_R/r_C$. Alternatively, $T_R/r_R>Tc/r_C$ or $T_R/r_R\approx T_C/r_C$, or a thickness-resistivity ratio of each resistive layer should be greater than or about equal to a thickness-resistivity ratio of each conductive layer. The current in leads 302 and 304 is thus spread between the conductive layers 160 and 164 and the resistive layers 162 and 166, avoiding current crowding. Additional conductive and resistive layers can be similarly formed.

Instead of the lead structures described above, other lead structures that overlap a MR structure can be made to reduce current crowding in the leads. Exemplary lead structures include a single layer of Cr or laminates of Cr/Mo/Cr, β-Ta/Au/β-Ta, Cr/α-Ta/Au/Cr/α-Ta, β-Ta/Au/Cr/α-Ta, TiW/α-Ta/Au/TiW/α-Ta or β-Ta/Au/TiW/α-Ta.

Although the present disclosure has focused on teaching the preferred embodiments, other embodiments and modifications of this invention will be apparent to persons of ordinary skill in the art in view of these teachings. For example, the sensing device may be part of a magnetic head that includes a write element that may be previously or subsequently formed. Alternatively, the sensing device may be used for measuring or testing for magnetic fields. Therefore, this invention is to be limited only by the following claims, which include all such embodiments and modifications when viewed in conjunction with the above specification and accompanying drawings.

What is claimed is:

1. A device comprising:

a magnetoresistive structure having a first edge and a second edge that are separated in a track-width direction by a first distance;

a first bias layer adjoining said first edge;

a second bias layer adjoining said second edge;

a first lead layer disposed adjacent to said first bias layer and overlapping said first edge; and a second lead layer disposed adjacent to said second bias layer and overlapping said second edge;

wherein said first and second lead layers are separated from each other in said track-width direction by a second distance that is less than said first distance, said first lead layer including a resistive layer and a conductive layer, the resistive layer having a resistivity greater than $10^{-7}$ Ωm at 25° C. and a greatest thickness larger than half that of said first lead layer, the conductive layer having a thickness to resistivity ratio that is not more than about that of the resistive layer and a conductive layer resistivity less than $10^{-7}$ Ωm.

2. The device of claim 1, further comprising a capping layer disposed between said magnetoresistive structure and said first and second lead layers, said capping layer having a thickness that is greater in first and second regions disposed adjacent to said first and second edges, respectively, than in a third region disposed between said first and second regions.

3. The device of claim 2, wherein said first and second regions have a resistivity that is less than that of said third region.

4. The device of claim 1, further comprising a capping layer disposed between said magnetoresistive structure and said first and second lead layers, said capping layer having a resistivity greater than $10^{-7}$ Ωm at 25° C.

5. The device of claim 1, wherein said device has a media-facing surface, and said first and second lead layers extend further than said magnetoresistive structure from said media-facing surface.

6. The device of claim 1, wherein said first and second lead layers each include a layer of chromium having a thickness that is greater than 250 Å.

7. The device of claim 1, wherein the conductive layer has a thickness-to-resistivity ratio that is about equal that of said resistive layer.

8. The device of claim 1, wherein said magnetoresistive structure includes a first ferromagnetic layer separated from a second ferromagnetic layer by an electrically conductive, nonmagnetic spacer layer, said first ferromagnetic layer having a magnetization direction that is substantially fixed in the presence of an applied magnetic field, said second ferromagnetic layer having a magnetization direction that varies in response to said applied magnetic field.

9. A device comprising:

a magnetoresistive structure disposed adjacent to a media-facing surface and having a first edge and a second edge that are separated by a first distance in a track-width direction;

a first bias layer adjoining said first edge and a second bias layer adjoining said second edge; and a first lead layer disposed adjacent to said first bias layer and extending beyond said first edge to overlap said magnetoresistive structure in a portion of a first region, and a second lead layer disposed adjacent to said second bias layer and extending beyond said second edge to overlap said magnetoresistive structure in a portion of a second region, said first and second regions separated from each other in said track-width direction by a second distance that is less than said first distance, said first and second regions extending further than said magnetoresistive structure from said media-facing surface, said first lead layer including a resistive layer having a resistive layer thickness and a resistive layer resistivity, said first lead layer including a conductive layer having a conductive layer thickness and a conductive layer resistivity, the conductive layer resistivity being less than $10^{-7}$ Ωm;

wherein a ratio of said resistive layer thickness to said resistive layer resistivity is greater than or about equal to a ratio of said conductive layer thickness to said conductive layer resistivity.

10. The device of claim 9, further comprising a capping layer disposed between said magnetoresistive structure and said first and second lead layers, said capping layer having a thickness that is greater in said first and second regions than in a third region disposed between said first and second regions.

11. The device of claim 10, wherein said third region has a resistivity that is greater than that of said first and second regions.

12. The device of claim 9, wherein said first and second lead layers include a material having a resistivity less than $6\times10^{-8}$ Ωm at 25° C.

13. The device of claim 9, wherein said first and second lead layers include a material having a resistivity greater than $10^{-7}$ Ωm at 25° C.

14. The device of claim 9, wherein said second lead layer includes plural resistive layers and plural conductive layers, said resistive layers each having a thickness-to-resistivity ratio that is greater than that of each of said conductive layers.

15. The device of claim 9, wherein said magnetoresistive structure includes a first ferromagnetic layer separated from a second ferromagnetic layer by an electrically conductive, nonmagnetic spacer layer, said first ferromagnetic layer having a magnetization direction that is substantially fixed in the presence of an applied magnetic field, said second ferromagnetic layer having a magnetization direction that varies in response to said applied magnetic field.

* * * * *